United States Patent [19]

Sano et al.

[11] Patent Number: 4,709,279

[45] Date of Patent: Nov. 24, 1987

[54] READ/WRITE AMPLIFIER POWER CONTROL DEVICE FOR A DISK APPARATUS

[75] Inventors: Masaki Sano, Fuji; Koji Osafune, Tokyo, both of Japan

[73] Assignee: Kabushiki Kaisha Toshiba, Kawasaki, Japan

[21] Appl. No.: 771,897

[22] Filed: Sep. 3, 1985

[30] Foreign Application Priority Data

Sep. 4, 1984 [JP] Japan ............................ 59-183862

[51] Int. Cl.[4] ...................... G11B 21/08; G11B 19/02

[52] U.S. Cl. ...................................... 360/78; 360/69

[58] Field of Search ..................... 360/55, 69, 75, 78, 360/77, 97, 98, 99, 137, 86, 106, 61, 67, 62, 71; 318/685, 696

[56] References Cited

U.S. PATENT DOCUMENTS 4,291,346 9/1981 Beecroft et al. .................... 360/75
4,604,663 8/1986 Moribe et al. ...................... 360/73

FOREIGN PATENT DOCUMENTS 0133233 2/1985 European Pat. Off. ............ 360/69
58-108061 6/1983 Japan .................................. 360/55

OTHER PUBLICATIONS

IBM TDB vol. 20, No. 5, Oct. 1977, Schaller, pp. 1792–1794.

*Primary Examiner*—Raymond F. Cardillo
*Assistant Examiner*—Steven R. Garland
*Attorney, Agent, or Firm*—Finnegan, Henderson, Farabow, Garrett & Dunner

[57] ABSTRACT

A power control device for a disk apparatus has first and second flip-flops respectively constituted by monostable multivibrators for latching $\overline{STEP}$ and $\overline{MOTO\ RON}$ signals supplied from a floppy disk controller during execution of a seek instruction of a main processor. An output from the second flip-flop is disabled before the $\overline{STEP}$ signal is supplied thereto. A period of time T2 for which a final $\overline{STEP}$ signal is supplied to the second flip-flop and then the output from the first flip-flop is disabled is longer than a pulse width of the $\overline{STEP}$ signal. Q outputs from the first and second flip-flops are supplied to first and second transistors through a NOR gate. Collector outputs of the first and second transistors are supplied to the bases of third and fourth transistor whose emitters respectively receive voltages of +12 V and +5 V. An output from the NOR gate is kept low for a predetermined period of time until the rush current is eliminated after the spindle motor is started, and for a predetermined period of time after the step pulse is supplied to drive the stepping motor. The first and second transistors are kept off and then the third and fourth transistors are also kept off. Power supply voltages of +12 V and +5 V are not supplied to a read/-write amp.

6 Claims, 26 Drawing Figures

FIG. 3A (PRIOR ART) TOTAL POWER DISSIPATION

FIG. 3B (PRIOR ART) EXTERNAL POWER SUPPLY

FIG. 3C (PRIOR ART) $\overline{\text{MOTOR ON}}$ SIGNAL

FIG. 3D (PRIOR ART) SEEK OPERATION

FIG. 3E (PRIOR ART) POWER SUPPLY VOLTAGE TO STEPPING MOTOR

FIG. 3F (PRIOR ART) POWER DISSIPATION OF SPINDLE MOTOR

FIG. 3G (PRIOR ART) POWER SUPPLY VOLTAGE TO READ/WRITE AMP.

FIG. 5A TOTAL POWER DISSIPATION

FIG. 5B EXTERNAL POWER SUPPLY

FIG. 5C $\overline{\text{MOTOR ON}}$ SIGNAL

FIG. 5D SEEK OPERATION

FIG. 5E POWER SUPPLY TO STEPPING MOTOR

FIG. 5F POWER DISSIPATION OF SPINDLE MOTOR

FIG. 5G POWER SUPPLY TO READ/WRITE AMP

F I G. 6
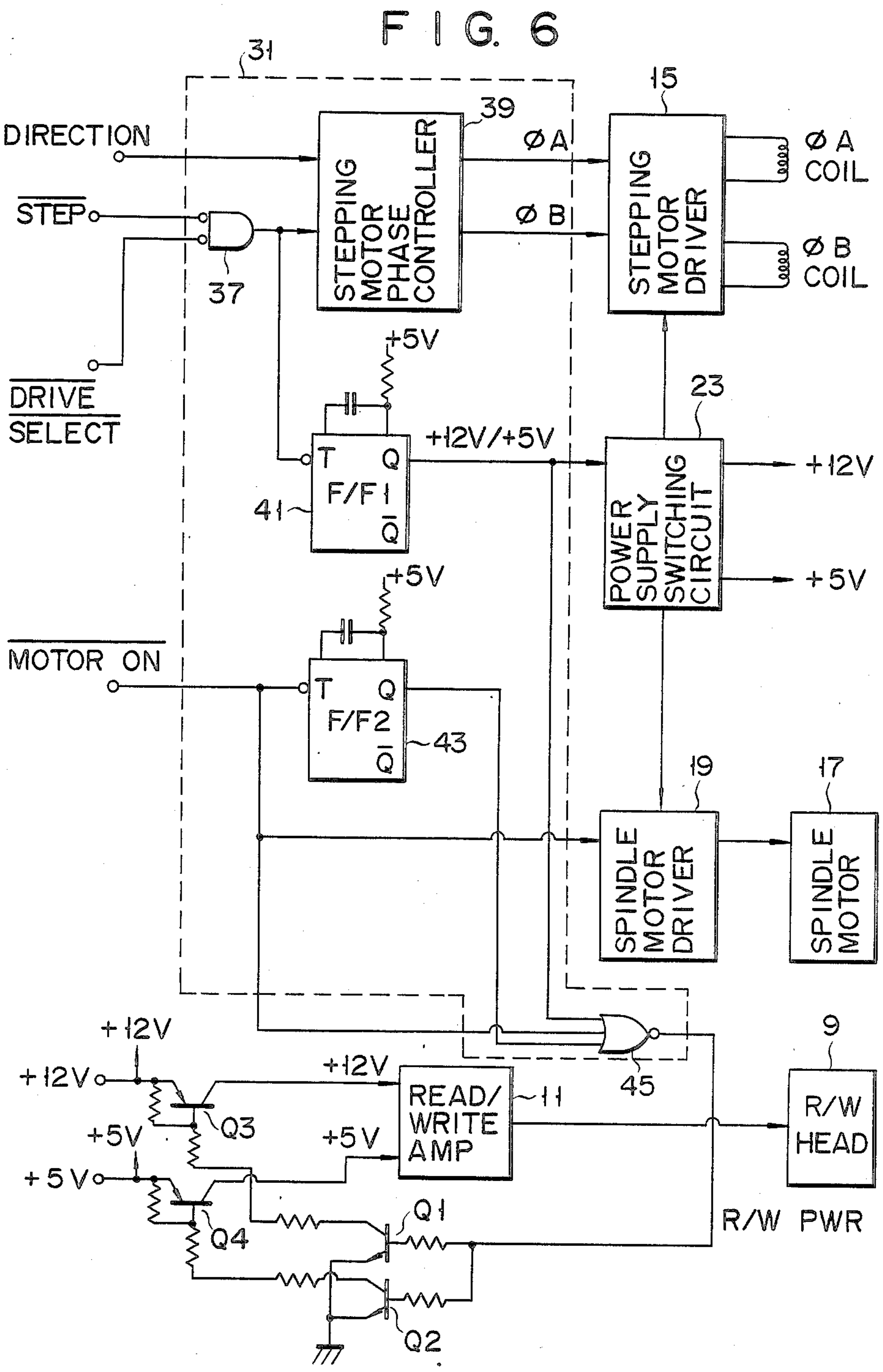

READ/WRITE AMPLIFIER POWER CONTROL DEVICE FOR A DISK APPARATUS

BACKGROUND OF THE INVENTION

The present invention relates to a disk apparatus with low power consumption.

A conventional disk apparatus, e.g., a floppy disk system is illustrated in FIG. 1. Floppy disk drivers 5 and 7 for driving the floppy disk drive are connected to a floppy disk controller 3 and a main processor 1 through a floppy disk interface (not shown). The controller 3 controls the drivers 5 and 7 under the control of the processor 1 to perform data read/write access, serial/-parallel conversion and CRC (Cyclic Redundancy Check).

FIG. 2 is a detailed block diagram of a conventional floppy disk driver 5. The driver 5 has a magnetic head 9, a read/write amp 11 for supplying a read/write signal to the head 9, a stepping motor 13 for driving a carriage having the head 9 thereon, a stepping motor driver 15, a spindle motor 17 for driving the floppy disk, a spindle motor driver 19, a power supply controller 21, a power supply switching circuit 23 and a controller 25 for controlling the abovementioned components 11, 15, 19 and 21.

The controller 25 controls the overall operation of the driver 5 in response to an interface signal supplied from the controller 3. The controller 25 comprises a random logic circuit constituted by TTL gates or a microprocessor controlled by a program. The controller 25 is connected to the controller 21. The controller 21 is connected to the circuit 23. The controller 21 controls power supply switching of the circuit 23. The circuit 23 supplies a plurality of power supply voltages 27 externally supplied under the control of the controller 21 to or stops supplying them to the driver 15, the motor 13, the driver 19 and the motor 17. At the same time, the circuit 23 switches different types of power supply voltages (e.g., +5 V and +12 V). The circuit 23 supplies the power supply voltage to the driver 19 and the motor 17 or stops supplying it thereto. On the other hand, the circuit 23 supplies the power supply voltage to the driver 15 and the motor 13 or stops supplying it thereto, and switches the different types of power supply voltages applied to the driver 15 and the motor 13. The selection of the power supply voltage applied to the driver 15 and the motor 13 by the circuit 23 is performed such that a DC +12 V voltage is applied to the driver 15 and the motor 13 when the motor 13 requires a high torque, but a DC +5 V voltage is supplied thereto when the motor 13 requires a low torque. The amp 11 directly receives the externally applied power supply voltage.

In order to decrease power dissipation of the floppy disk driver 5 having the arrangement described above, the following implementation is utilized. A $\overline{\text{MOTORON}}$ signal is used as one of interface signals 29. Motor 17 may be controlled by the processor 1 directly in response to the MOTORON signal. Specifically, when the MOTORON signal is active (has a predetermined value), the controller 25 directly controls the controller 21, and the power supply voltage 27 is supplied from the circuit 23 to the driver 19 and the motor 17.

However, when the voltage level of the MOTORON signal is not active, the power supply voltage is not supplied from the circuit 23 to the driver 19 and the motor 17. In this manner, when the processor 1 does not use the driver 5, the power supply voltage is not supplied to the driver 19 and the motor 17, thereby achieving lower power dissipation and hence decreasing heat dissipation. The two types of power supply voltages are selectively applied to the motor 13 in accordance with the operating mode.

While the motor 13 is being operated, i.e., while a magnetic head seek is being performed, a high torque is required, so that the motor 13 receives a high voltage (i.e., 12 V). A period of time (generally called a "settling time") required for application of the high voltage is started when the head receives a seek instruction from the processor 1 and starts a seek operation (i.e., after a STEP PULSE as one of the interface signals is received) and is ended when the seek instruction is completely executed and the stepping motor is completely stopped.

When the motor 13 is stopped, i.e., when the head 9 is positioned above a predetermined track, a low voltage (+5 V) is applied to the motor 13 since a low torque is required in order not to cause a positioning error of the head 9.

When the processor 1 does not use the driver 5 and is held in the wait mode, the power supply voltage is not supplied to the driver 15 and the motor 13, thereby achieving low power consumption and decreasing heat generation.

FIGS. 3A through 3G are timing charts of signals for explaining the power consumption state of the driver 5. FIG. 3A shows a change in total power dissipation, FIG. 3B shows an application state of the external power supply voltage 27, FIG. 3C shows a state of the $\overline{\text{MOTORON}}$ signal, FIG. 3D shows a seek operation, FIG. 3E shows a state of the power supply voltage applied to the motor 13, FIG. 3F shows a state of power consumption in the motor 17, and FIG. 3G shows a state of the power supply voltage applied to the amp 11. As is apparent from FIGS. 3A through 3G, the power supply voltage 27 is always applied to the amp 11 irrespective of the operation mode of the driver 5, so that the amp 11 always consumes power and radiates heat. In particular, the voltage 27 is applied to the amp 11 when the motor 17 is started and while the seek operation is being performed. As a result, high power is consumed.

SUMMARY OF THE INVENTION

It is an object of the present invention to provide a power control device in a disk apparatus having low total power consumption by preventing excessive power supply and averaging the power consumption.

In order to achieve the above object of the present invention, there is provided a floppy disk apparatus comprising:

a magnetic head for accessing a magnetic recording medium, generating a read signal in a data read mode and generating a write signal in a data write mode;

a read/write amplifier for amplifying the read signal supplied from the magnetic head and the write signal supplied to the magnetic head;

a power supply for supplying power to the read/-write amplifier; and power supply control means for supplying power to the read/write amplifier while the read/write amplifier is operative and cutting off power supply to the read/-write amplifier while the read/write amplifier is inoperative.

According to a power control device for a disk apparatus of the present invention, the power supply voltage is not supplied to the read/write amp 11 except for a necessary period of time, thereby decreasing power consumption. A peak of the total power consumption can be eliminated, and the power consumption of the overall system can be averaged. As a result, heat generation can be decreased as a whole.

BRIEF DESCRIPTION OF THE DRAWINGS

Other objects and features of the present invention will be apparent from the following description taken in connection with the accompanying drawings, in which:

FIGS. 5A through 5G are respectively timing charts for explaining the operation of the power control device in the disk apparatus of the present invention, in which FIG. 5A shows a total power consumption, FIG. 5B shows an external power supply voltage, FIG. 5C shows a $\overline{\text{MOTORON}}$ signal, FIG. 5D shows a seek operation state, FIG. 5E shows a power supply voltage applied to the stepping motor, FIG. 5F shows power consumption of the spindle motor, and FIG. 5G shows a power supply voltage applied to the read/write amp;

FIG. 6 is a detailed circuit diagram of a controller shown in FIG. 4; and FIGS. 7A through 7H are respectively timing charts for explaining the operation of the controller 31, in which FIG. 7A shows a $\overline{\text{MOTORON}}$ signal, FIG. 7B shows a $\overline{\text{STEP}}$ signal, FIG. 7C shows an output from a first flip-flop 41, FIG. 7D shows an output from a second flip-flop 43, FIG. 7E shows an output from a NOR gate 45, FIG. 7F shows a base voltage applied to transistors Q1 and Q2, and FIGS. 7G and 7H respectively show +12 and +5 V power supply voltages applied to the read/write amp 11.

DETAILED DESCRIPTION OF THE PREFERRED EMBODIMENT

Figure 1:
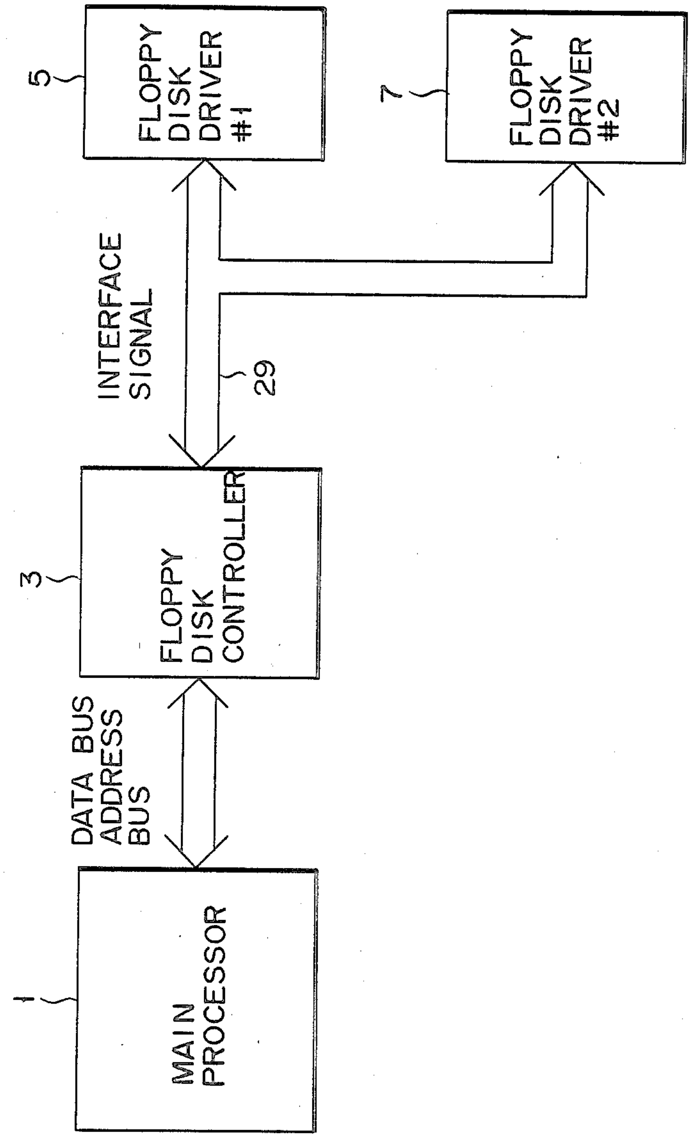
FIG. 1 is a block diagram showing the system configuration of a conventional floppy disk apparatus.
Figure 2:
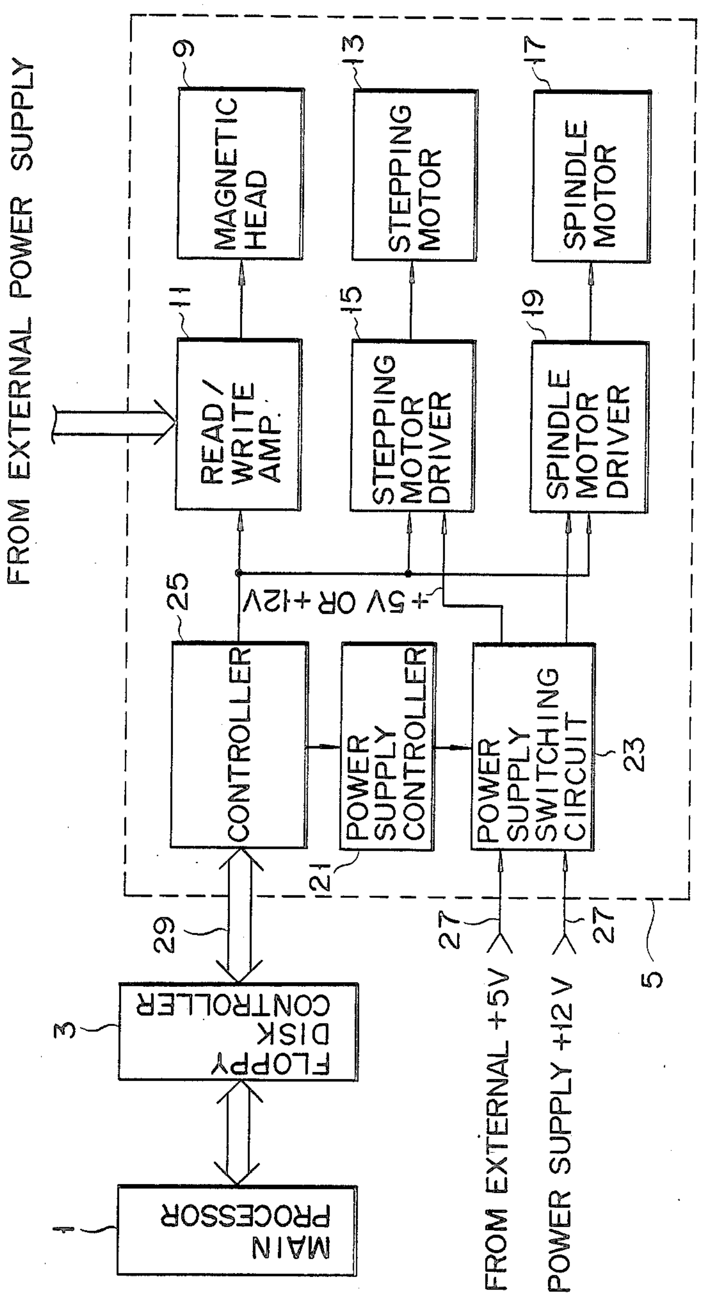
FIG. 2 is a detailed block diagram of a floppy disk driver shown in FIG. 1.
Figure 3:
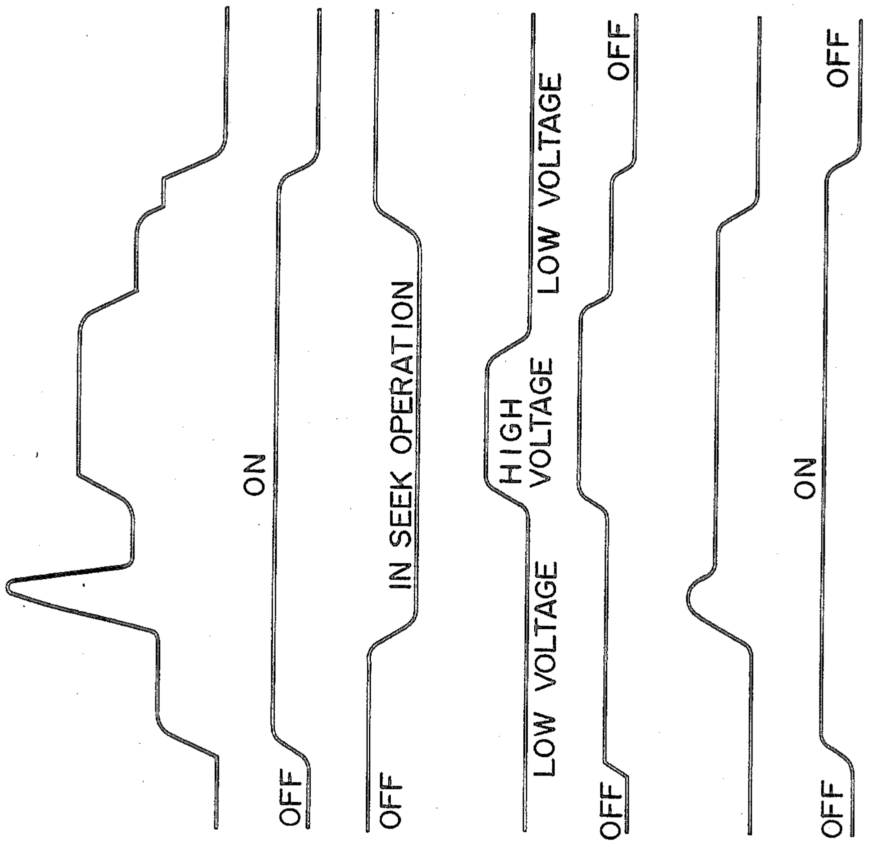
FIGS. 3A through 3G are respectively timing charts showing the power consumption state of the driver shown in FIG. 2.
Figure 4:
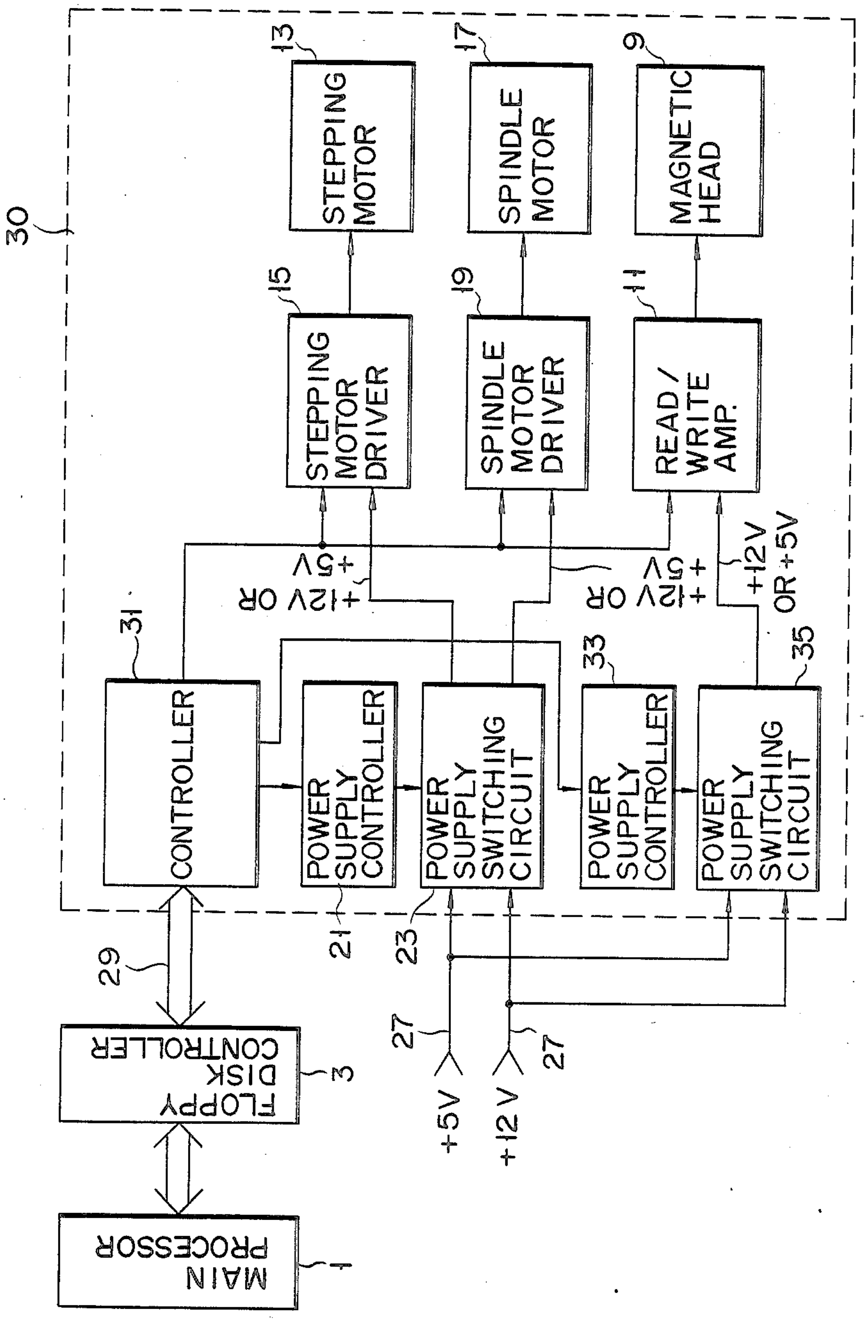
FIG. 4 is a detailed block diagram of the driver 5 according to an embodiment of the present invention.
Figure 5:
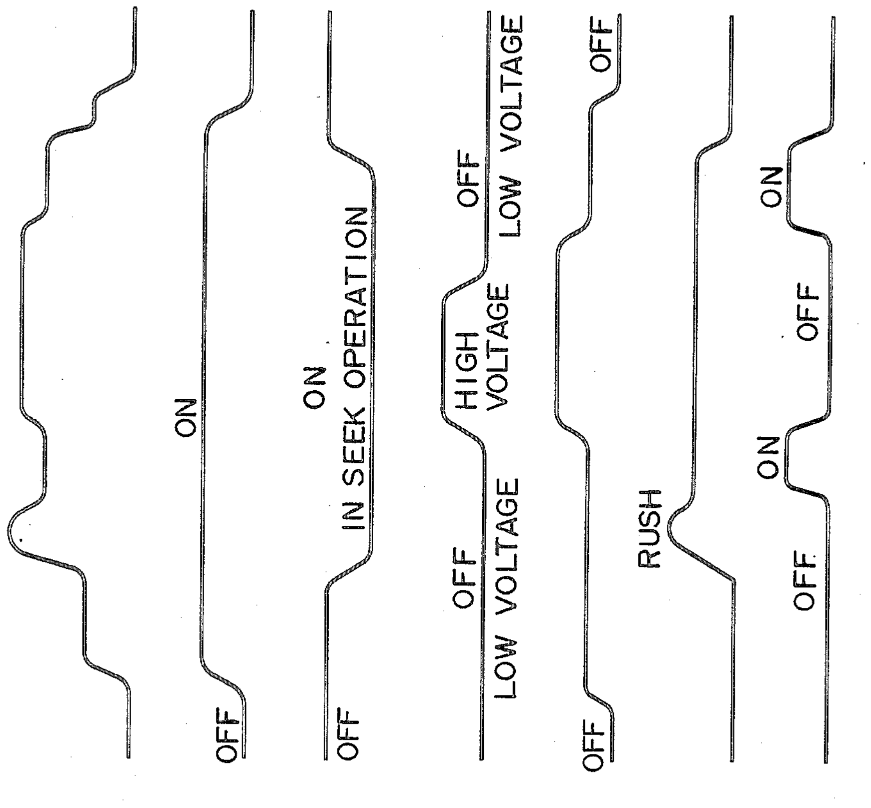

A preferred embodiment will be described with reference to FIGS. 4 through 7A to 7H. FIG. 4 is a block diagram of a floppy disk driver 30 according to an embodiment of the present invention. The same reference numerals in FIG. 4 denote the same parts as in FIG. 2. Referring to FIG. 4, the driver 30 is controlled by a floppy disk interface signal 29 supplied from a floppy disk controller 3 under the control of a main processor 1. A read/write amp 11 amplifies read and write signals with respect to a magnetic head 9. A stepping motor 13 drives a carriage having the head 9 thereon. The motor 13 is driven by a stepping motor driver 15. A spindle motor 17 drives the floppy disk. The motor 17 is driven by a spindle motor driver 19. A controller 31 controls the overall operation of the driver 30. A power supply switching circuit 23 supplies +5 and +12 V power supply voltages 27 (when the driver 5 is incorporated in a personal computer system, for example, these voltages are those from the personal computer) externally supplied under the control of the controller 21 to or stops supplying them to the driver 15, the motor 13, the driver 19 and the motor 17. At the same time, the circuit 23 switches different types of power supply voltages (e.g., +5 V and +12 V). The circuit 23 supplies the power supply voltage to the driver 19 and the motor 17 or stops supplying it thereto. On the other hand, the circuit 23 supplies the power supply voltage to the driver 15 and the motor 13 or stops supplying it thereto, and switches the different types of power supply voltages applied to the driver 15 and the motor 13. The selection of the power supply voltage applied to the driver 15 and the motor 13 by the circuit 23 is performed such that a DC +12 V voltage is applied to the driver 15 and the motor 13 when the motor 13 requires a high torque, but a DC +5 V voltage is supplied thereto when the motor 13 requires a low torque.

The controller 31 exchanges interface signals 29 with the controller 3 to perform decoding and execution of an instruction from the processor 1, a status acknowledgement to the processor 1, reception/transmission of data with respect to the amp 11, sending of the read/write instruction, start/stop control of the driver 19 for controlling the motor 17, and excitation phase control of the driver 15 for controlling the motor 13. In this manner, the controller 31 performs control of the overall system. The controller 31 comprises a random logic circuit of TTL gates or the like. However, the controller 31 may comprise a microprocessor controlled by a program.

The power supply controller 21 controls the power supply switching circuit 23 under the control of the controller 31. The controller 21 causes the circuit 23 to supply a high voltage (DC +12 V) to the motor 13 while the head 9 performs a seek. However, when low torque is required, i.e., when the head 9 is located above a predetermined track, the controller 21 causes the circuit 23 to apply a low voltage (DC +5 V) to the motor 13. A power supply controller 33 controls operation of a power supply switching circuit 35 under the control of the controller 31. The circuit 35 selectively supplies the power supply voltages 27 under the control of the controller 33.

FIGS. 5A through 5G show the power dissipation state of the driver 30 shown in FIG. 4, in which FIG. 5A shows a change in total power dissipation, FIG. 5B shows a state of an application of the external power supply voltage 27, FIG. 5C shows a state of the $\overline{\text{MOTORON}}$ signal, FIG. 5D shows a state of seek, FIG. 5E shows a state of a power supply voltage applied to the stepping motor, FIG. 5F shows a state of power dissipation in the spindle motor, and FIG. 5G shows a state of the power supply voltage applied to the read/write amp 11.

FIG. 6 is a detailed circuit diagram of the controller 31 shown in FIG. 4. A step signal $\overline{\text{STEP}}$ and a drive select signal $\overline{\text{DRIVESELECT}}$ are supplied from the controller 3 to a 2-negative input AND gate 37. An output from the AND gate 37 is supplied to a stepping motor phase controller 39 and a first flip-flop 41. The controller 39 also receives a DIRECTION signal representing a rotational direction. The controller 39 supplies two phase signals $\phi$A and $\phi$B to the driver 15. The driver 15 supplies two phase signals to the motor 13 through $\phi$A and $\phi$B coils. The flip-flop 41 latches the output signal from the AND gate 37. The flip-flop 41 comprises a monostable multivibrator. A Q output signal from the flip-flop 41 is supplied to the circuit 23. The circuit 23 controls the power supply voltage supplied to the drivers 15 and 19. The signal $\overline{\text{MOTORON}}$ is supplied to a second flip-flop 43. The flip-flop 43 comprises a monostable multivibrator. The signal $\overline{\text{MOTORON}}$ is also supplied to the driver 19.

Q outputs from the flip-flops 41 and 43 and the $\overline{\text{MOTORON}}$ signal are supplied to a NOR gate 45. An output from the NOR gate 45 is supplied to the bases of first and second transistors Q1 and Q2 serving as switches. The emitters of the transistors Q1 and Q2 are commonly grounded. The collector terminals of the transistors Q1 and Q2 are respectively connected to the bases of transistors Q3 and Q4 through resistors. A voltage of +12 V is applied to the emitter of the transistor Q3, and a voltage of +5 V is applied to the emitter of the transistor Q4. The collectors of the transistors Q3 and Q4 are connected to the amp 11. The portion surrounded by the broken line is a peripheral LSI chip model No. T6677S available from TOSHIBA CORPORATION, Japan.

The operation of the power control device for the disk apparatus having the system configuration according to the present invention will be described hereinafter. Implementation and operation of the device for decreasing power dissipation in the motors 13 and 17 are the same as in a conventional apparatus, and a detailed description thereof will be omitted.

An operation for decreasing power dissipation for the amp 11 will be described hereinafter. The data read/write access with respect to the head 9 is performed when the following two conditions are satisfied:

(i) The motor 17 is rotated at a constant speed. In other words, the signal $\overline{\text{MOTORON}}$ is generated from the controller 3.

(ii) The motor 13 is stopped. In other words, the signal $\overline{\text{STEP}}$ is disabled.

As is apparent from FIG. 5F, a rush current during starting of the motor 17 and high-voltage supply to the motor 13 causes a peak in total power dissipation. Under the control of the controllers 31 and 33, the circuit 35 stops supplying the power supply voltage 27 to the amp 11 for a predetermined period of time until the rush current disappears after the motor 17 is started, during the seek of the head 9, and until a predetermined period of time has elapsed after the final step pulse is supplied from the processor 1 to drive the motor 13.

Figures 7A, 7B, 7C, 7D, 7E, 7F, 7G, 7H:
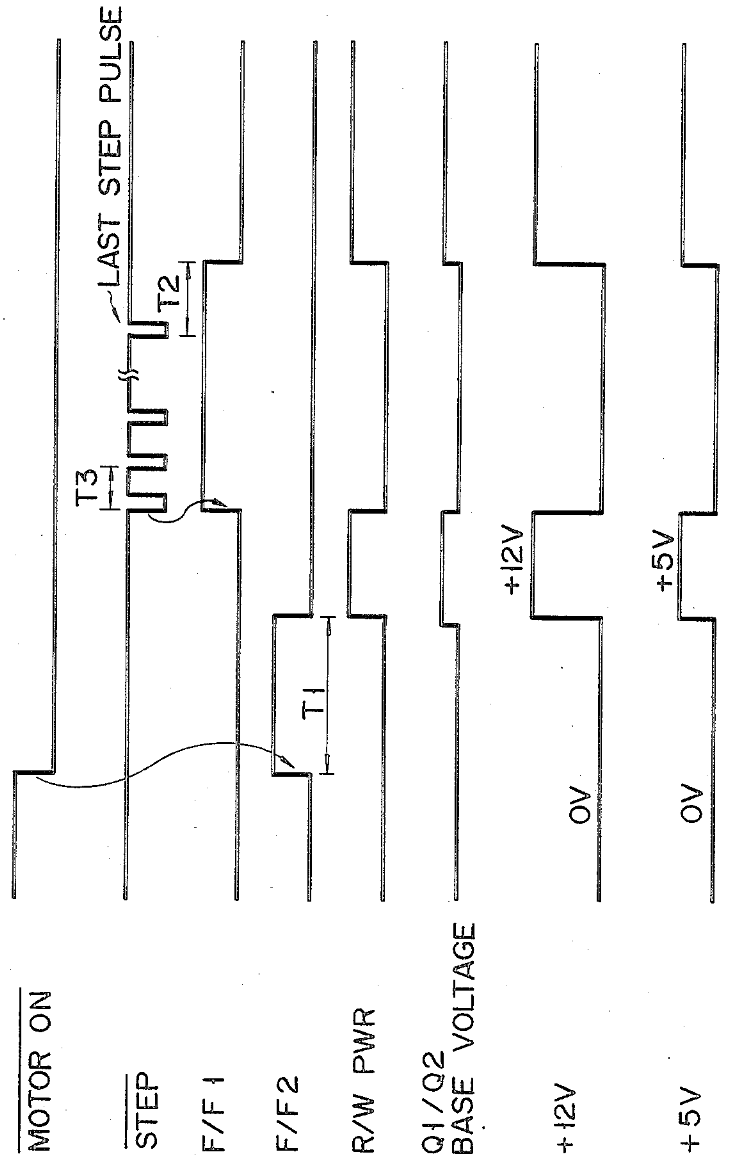

Until the floppy disk controller generates the $\overline{\text{MOTORON}}$ signal after the power supply voltage 27 rises, i.e., until the $\overline{\text{MOTORON}}$ signal is non active and is set at high level, the output of low level (FIG. 7E) is supplied from the NOR gate 45 to the bases of the transistors Q1 and Q2. As a result, the base potentials of the transistors Q1 and Q2 are set at 0 V, as shown in FIG. 7F. In this state, the transistors Q1 and Q2 are kept off. For this reason, the transistors Q3 and Q4 are also kept off. The voltages of +12 V and +5 V shown in FIGS. 7G and 7H are not supplied to the amp 11. The controller 3 generates the $\overline{\text{MOTORON}}$ signal as shown in FIG. 7A in response to the instruction from the processor 1. The $\overline{\text{MOTORON}}$ signal is active and is set at low level, as shown in FIG. 7A. The $\overline{\text{MOTORON}}$ signal is latched by the flip-flop 43, as shown in FIG. 7D. The Q output of high level from the flip-flop 43 is supplied to one input terminal of the NOR gate 45. The NOR gate 45 supplies the low level signal (FIG. 7E) to the bases of the transistors Q1 and Q2. The base potentials of the transistors Q1 and Q2 are set at 0 V, as shown in FIG. 7F, and the transistors are kept off. The transistors Q3 and Q4 are also kept off. Therefore, the voltages of +12 V and +5 V are not supplied to the amp 11, as shown in FIGS. 7G and 7H.

The Q output from the flip-flop 43 is disabled when a predetermined period of time (i.e., time T1) has elapsed. The Q output of low level from the flip-flop 41 and the Q output of low level from the flip-flop 43 are supplied to the NOR gate 45. The NOR gate 45 generates a signal of high level, as shown in FIG. 7E. The bases of the transistors Q1 and Q2 receive the signals of high level, as shown in FIG. 7F. The transistors Q1 and Q2 are turned on, and the voltages of +12 V and +5 V are supplied to the amp 11, as shown in FIGS. 7G and 7H, respectively.

Thereafter, the controller 3 performs the seek operation in response to the seek instruction from the processor 1, and the $\overline{\text{STEP}}$ signal (FIG. 7B) and the $\overline{\text{DRIVE SELECT}}$ signal are supplied to the AND gate 37. The output from the AND gate 37 is latched by the flip-flop 41, as shown in FIG. 7C. The Q output of high level from the flip-flop 41 and the Q output of low level from flip-flop 43 are simultaneously supplied to the NOR gate 45. In this case, since the signal of low level is supplied from the NOR gate 45 to the bases of the transistors Q1 and Q2, the transistors Q1 and Q2 are kept off, and the transistors Q3 and Q4 are also kept off. Therefore, the voltages of +12 V and +5 V are not supplied to the amp 11 in the same manner as described above.

As shown in FIG. 7B, when a predetermined period of time T2 has elapsed after the final step pulse is supplied, the Q output from the flip-flop 41 falls. For this reason, the Q outputs from the flip-flops 41 and 43 go low. The signals of low level are supplied to the NOR gate 45, so that the transistors Q1 and Q2 and then the transistors Q3 and Q4 are turned on. As a result, the voltages of +12 V and +5 V shown in FIGS. 7G and 7H are supplied to the amp 11.

A period of time T2 until the Q output from the flip-flop 41 falls in response to the final step pulse after an input T to the flip-flop 41 is triggered by a trigger signal from the AND gate 37 and an output signal then rises is designed to be longer than the step pulse width T3 of FIG. 7B. With such a design, the power supply voltage 27 can be continuously cut off from the amp 11 during the seek operation.

The above embodiment exemplifies the floppy disk driver. However, the present invention is not limited to this. For example, the present invention can be applied to a hard disk driver or an optical disk driver.

What is claimed is:

1. A power control device for a disk apparatus having a magnetic head for supplying a read signal and receiving a write signal and a read-write amplifier adapted to receive power from an external power supply for amplifying the read signal supplied from the magnetic head and the write signal supplied to the magnetic head in response to a power supply control signal generated by a power supply control signal generating means in response to a signal to start rotation of a spindle motor and a signal from the start of a seek operation to the completion of a seek operation to the completion of a seek operation generated by a main processor upon execution of a seek instruction for causing the disk apparatus to perform a seek operation on a disk, comprising:

a rotatable spindle motor adapted to rotate a magnetic recording disk;
a stepping motor for causing the magnetic head to move during a seek operation;

first power supply switching control means for selectively controlling the supply of power from a power source to said spindle motor and said stepping motor;

second power supply switching control means for prohibiting power from being supplied to the read/write amplifier from the external power supply for a preselected period of time after the start of rotation of said spindle motor and between the start of the seek operation and the completion of the seek operation in response to said power supply control signal.

2. A power control device for a disk apparatus having a magnetic head for supplying a read signal and receiving a write signal, for prohibiting power from an external power supply connected to said power control device from being supplied to a read/write amplifier for amplifying the read signal supplied from the magnetic head and the write signal supplied to the magnetic head in response to a power supply control signal generated by a main processor executing a seek instruction for causing the disk apparatus to perform a seek operation on a disk, comprising:

a spindle motor for rotating a magnetic recording disk;

a stepping motor for causing the magnetic head to move during a seek operation;

enabling/disabling means for enabling a power-off signal by generating the power-off signal in response to the power supply control signal, and for disabling the power-off signal when a predetermined period of time has elapsed; and switching means, connected to the read/write amplifier, for prohibiting power from being supplied to the read/write amplifier in response to the power-off signal being enabled by said enabling/disabling means.

3. A device according to claim 2, wherein the main processor generates a STEP signal to instruct rotation of said stepping motor and a MOTORON signal for controlling the spindle motor during execution of a seek instruction, and wherein said enabling/disabling means comprises a first monostable multivibrator for latching the STEP signal to produce an output, and a second monostable multivibrator for latching the MOTORON signal to produce an output, and wherein the power-off signal is enabled by the latching of the STEP and MOTORON signals.

4. A device according to claim 3, further comprising gate means for turning off said switching means when one of the outputs from said first and second monostable multivibrators has a predetermined value.

5. A device according to claim 3, wherein said second monostable multivibrator enables the output signal therefrom in response to the latching of the MOTORON signal thereby, and disables the output signal therefrom before a first STEP signal is latched in said first monostable multivibrator, and wherein said first monostable multivibrator disables the output signal therefrom upon receipt of a final STEP signal, a period for disabling the output signal from said first monostable multivibrator being set to be longer than a pulse width of the STEP signal, so that power being supplied to said read/write amplifier is prohibited for a predetermined period of time after starting of rotation of said spindle motor and for a predetermined period of time between starting the seek operation and a predetermined time after completion of the seek operation.

6. A power control device for a disk apparatus having a magnetic head for supplying a read signal and receiving a write signal and a read/write amplifier adapted to receive power from an external power supply for amplifying the read signal supplied from the magnetic head and the write signal supplied to the magnetic head in response to a power supply control signal generated in response to POWERON and STEP signals generated by a main processor upon execution of a seek instruction for causing said disk apparatus to perform a seek operation on a disk, comprising:

a rotatable spindle motor adapted to rotating a magnetic recording disk;

a stepping motor for causing the magnetic head to move a seek operation;

first power supply switching control means for selectively controlling the supply of power from a power source to said spindle motor and said stepping motor; second power supply switching control means, comprising:

a first monostable multivibrator which is triggered in response to the STEP signal for driving said stepping motor and a second monostable multivibrator which is triggered in response to the MOTORON signal for driving said spindle motor;

switching means, connected to the read/write amplifier, and having an off state for prohibiting power from being supplied to the read/write amplifier from the external power supply and an on state for enabling power to be supplied to the read/write amplifier from the external power supply; and a gate for turning said switching means to the on state by generating said power control signal in response to the triggering of said first and second monostable multivibrators.

* * * * *